(12) United States Patent
Jeong et al.

(10) Patent No.: US 12,288,839 B2
(45) Date of Patent: Apr. 29, 2025

(54) BATTERY CELL TERRACE ALIGNMENT DEVICE

(71) Applicant: CLEVER CO., LTD., Chungcheongbuk-do (KR)

(72) Inventors: Jong Hong Jeong, Chungcheongbuk-do (KR); Sang Jin Kim, Daejeon (KR)

(73) Assignee: CLEVER CO., LTD., Chungcheongbuk-do (KR)

( * ) Notice: Subject to any disclaimer, the term of this patent is extended or adjusted under 35 U.S.C. 154(b) by 409 days.

(21) Appl. No.: 17/915,187

(22) PCT Filed: Mar. 31, 2021

(86) PCT No.: PCT/KR2021/003967
§ 371 (c)(1),
(2) Date: Sep. 28, 2022

(87) PCT Pub. No.: WO2021/201584
PCT Pub. Date: Oct. 7, 2021

(65) Prior Publication Data
US 2023/0135809 A1    May 4, 2023

(30) Foreign Application Priority Data
Mar. 31, 2020  (KR) .................. 10-2020-0039004

(51) Int. Cl.
*H01M 10/04* (2006.01)
*B23Q 3/18* (2006.01)
*B26D 7/01* (2006.01)

(52) U.S. Cl.
CPC ............ *H01M 10/04* (2013.01); *B23Q 3/186* (2013.01); *B26D 7/018* (2013.01); *H01M 10/0404* (2013.01)

(58) Field of Classification Search
CPC . B23Q 1/56; B23Q 1/585; B23Q 1/62; B23Q 1/626; B23Q 3/06; B23Q 3/064;
(Continued)

(56) References Cited

FOREIGN PATENT DOCUMENTS

| JP | 2000-044059 A | 2/2000 |
|---|---|---|
| JP | 2009-131933 A | 6/2009 |

(Continued)

OTHER PUBLICATIONS

International Search Report from corresponding PCT Application No. PCT/KR2021/003967, dated Jul. 13, 2021.

*Primary Examiner* — Tyrone V Hall, Jr.
(74) *Attorney, Agent, or Firm* — Harness, Dickey & Pierce, P.L.C.

(57) ABSTRACT

Disclosed is a battery cell terrace alignment device including a base part, a table provided straight (in an X-axis direction) in parallel with a process direction, a first front end support part provided on the base part, a second front end support part provided on the base part, a first rear end support part provided on the base part, a second rear end support part provided on the base part, alignment blocks respectively provided in the first front end support part, the second front end support part, the first rear end support part, and the second rear end support part, a close-contact member provided in any one of the first front end support part and the second front end support part or any one of the first and the second rear end support parts, and a man chamber guide member.

7 Claims, 7 Drawing Sheets

(58) Field of Classification Search
CPC ........... B23Q 3/18; B23Q 3/186; B25B 11/00; B25B 11/02; B25B 5/003; B25J 15/0052; B25J 15/0061; B25J 15/0253; B25J 15/0273; H01M 10/0404; H01M 10/0413; H01M 10/0436
See application file for complete search history.

(56) References Cited

FOREIGN PATENT DOCUMENTS

| KR | 10-1192376 | B1 | | 10/2012 | | |
|---|---|---|---|---|---|---|
| KR | 10-1908586 | B1 | | 10/2018 | | |
| KR | 102043113 | B1 | * | 12/2019 | ........ | H01M 10/0404 |
| WO | WO-2015065082 | A1 | * | 5/2015 | ........ | H01M 10/0404 |

* cited by examiner

BATTERY CELL TERRACE ALIGNMENT DEVICE

CROSS-REFERENCE TO RELATED APPLICATIONS

This application is a national phase application of PCT Application No. PCT/KR2021/003967, filed on 31 Mar. 2021, which claims the benefit and priority to Korean Patent Application No. 10-2020-0039004, filed on 31 Mar. 2020. The entire disclosures of the applications identified in this paragraph are incorporated herein by references.

TECHNICAL FIELD

The present disclosure relates to a battery cell terrace alignment device, and more particularly, to a battery cell terrace alignment device capable of precisely aligning a pouch-type battery cell for cutting an edge of the terrace of the battery cell by aligning the battery cell by simultaneously bringing a plurality of alignment blocks into contact with an electrode and the terrace, the plurality of alignment blocks corresponding in shape to the electrode and the terrace of the battery cell.

BACKGROUND ART

This section provides background information related to the present disclosure which is not necessarily prior art.

A battery cell includes a rectangular main chamber area in which an electrode assembly formed by stacking a positive plate, a separator, and a negative plate is received in a pouch, and a sealing area formed by sealing a rim of the pouch. This sealing area is referred to as a terrace.

In this case, in the case of a pouch-type battery cell, sealing is very important in ensuring sealability, insulation resistance, and the like, and thus a sealing area increases. To reduce an unnecessary space of the battery cell, an area, which remains after the sealing, is bent. In a case in which the remaining area is excessively large, a volume of the battery cell increases. Therefore, the remaining area is cut and removed, except for a necessarily required portion.

In addition, the terrace of the battery cell may be folded several times to prevent an insulation breakdown and minimize a size of the secondary battery cell. An edge portion of the terrace may be removed to improve accuracy and convenience in bending the terrace.

DISCLOSURE

Technical Problem

An object of the present disclosure is to provide a battery cell terrace alignment device capable of precisely aligning a battery cell for cutting an edge of a terrace of the battery cell by simultaneously bringing a plurality of alignment blocks into contact with an electrode and the terrace, the plurality of alignment blocks corresponding in shape to the electrode and the terrace of the battery cell.

Another object of the present disclosure is to provide a battery cell terrace alignment device capable of preventing upward and downward movements of a battery cell for cutting a terrace of the battery cell by stably supporting and fixing the battery cell by using a plurality of vacuum pads provided on a table on which the battery cell to be aligned is seated.

Still another object of the present disclosure is to provide a battery cell terrace alignment device, in which a plurality of lifting holes is provided in a table on which a battery cell to be aligned is seated, such that the battery cell may be lifted from a lower side to an upper side, and a plurality of alignment blocks may easily push and move the battery cell, thereby precisely aligning the battery cell to a desired position.

Technical Solution

This section provides a general summary of the disclosure and is not a comprehensive disclosure of its full scope or all of its features.

One aspect of the present disclosure provides a battery cell terrace alignment device including: a base part configured to support respective components to align a battery cell placed on an XY-plane; a table provided straight (in an X-axis direction) in parallel with a process direction and configured to support a lower surface of the battery cell in the process direction; a first front end support part provided on the base part and configured to be movable along XY-axes so as to come into close contact with one side of a front end of the battery cell; a second front end support part provided on the base part and configured to be movable along the XY-axes so as to come into close contact with the other side of the front end of the battery cell; a first rear end support part provided on the base part and configured to be movable along the XY-axes so as to come into close contact with one side of a rear end of the battery cell; a second rear end support part provided on the base part and configured to be movable along the XY-axes so as to come into close contact with the other side of the rear end of the battery cell; alignment blocks respectively provided in the first front end support part, the second front end support part, the first rear end support part, and the second rear end support part and configured to come into contact with the battery cell; a close-contact member provided in any one of the first front end support part and the second front end support part or any one of the first rear end support part and the second rear end support part and configured to provide an elastic force in an X-axis direction to allow the alignment block to come into close contact with the battery cell in a rear end direction or a front end direction; and a main chamber guide member provided in the other of the first front end support part and the second front end support part or the other of the first rear end support part and the second rear end support part, where the close-contact member is not provided, the main chamber guide member being configured to guide a main chamber area of the battery cell.

In the battery cell terrace alignment device according to the aspect of the present disclosure, the first front end support part, the second front end support part, the first rear end support part, and the second rear end support part each may include: an X-axis guide configured to move the alignment block in a direction parallel to a longitudinal direction of the table; and a Y-axis guide configured to move the alignment block in a direction perpendicular to the X-axis guide, and the alignment block may come into contact with the battery cell by being moved by the X-axis guide and the Y-axis guide.

In the battery cell terrace alignment device according to the aspect of the present disclosure, the alignment block may come into contact with a lateral surface of the battery cell or come into contact with an electrode and a terrace of the battery cell.

In the battery cell terrace alignment device according to the aspect of the present disclosure, the alignment block may have a contact end formed at a portion of the alignment block that comes into contact with the electrode and the terrace of the battery cell, and the contact end may have a stepped portion corresponding in shape to an insulation film.

In the battery cell terrace alignment device according to the aspect of the present disclosure, the table may be provided in the form of a straight bar parallel to the process direction, the tables may be provided in two parallel rows to support two opposite sides of the lower surface of the battery cell in the process direction, and the table may have a plurality of vacuum pads configured to hold the battery cell by a vacuum by a vacuum holding force that is selectively applied.

In the battery cell terrace alignment device according to the aspect of the present disclosure, among the plurality of vacuum pads, the vacuum pad at a middle portion may relatively further protrude than the vacuum pads at two opposite ends, and the vacuum pad at the middle portion may have an elastic body, such that the vacuum pad is movable upward or downward.

In the battery cell terrace alignment device according to the aspect of the present disclosure, the table may have a plurality of lifting holes disposed between the plurality of vacuum pads and configured to provide a lifting force to the battery cell.

Advantageous Effects

According to the present disclosure, it is possible to precisely align the battery cell for cutting the edge of the terrace of the battery cell by simultaneously bringing the plurality of alignment blocks into contact with the electrode and the terrace, and the plurality of alignment blocks may correspond in shape to the electrode and the terrace of the battery cell.

Further, according to the present disclosure, it is possible to prevent the upward and downward movements of the battery cell for cutting the terrace of the battery cell by stably supporting and fixing the battery cell by using the plurality of vacuum pads provided on the table on which the battery cell to be aligned is seated.

In addition, according to the present disclosure, the plurality of lifting holes is provided in the table on which the battery cell to be aligned is seated, such that the battery cell may be lifted from the lower side to the upper side, and the plurality of alignment blocks may easily push and move the battery cell, thereby precisely aligning the battery cell to a desired position.

MODES OF THE INVENTION

Hereinafter, embodiments for implementing a battery cell terrace alignment device according to the present disclosure will be described in detail with reference to the drawings.

However, it should be noted that the intrinsic technical spirit of the present disclosure is not limited by the following exemplary embodiment, and the following exemplary embodiment may easily be substituted or altered by those skilled in the art based on the intrinsic technical spirit of the present disclosure.

In addition, the terms used herein are selected for convenience of description and should be appropriately interpreted as a meaning that conform to the technical spirit of the present disclosure without being limited to a dictionary meaning when recognizing the intrinsic technical spirit of the present disclosure.

Hereinafter, the embodiments of the present disclosure will be described in detail with reference to the accompanying drawings.

Figure 1:
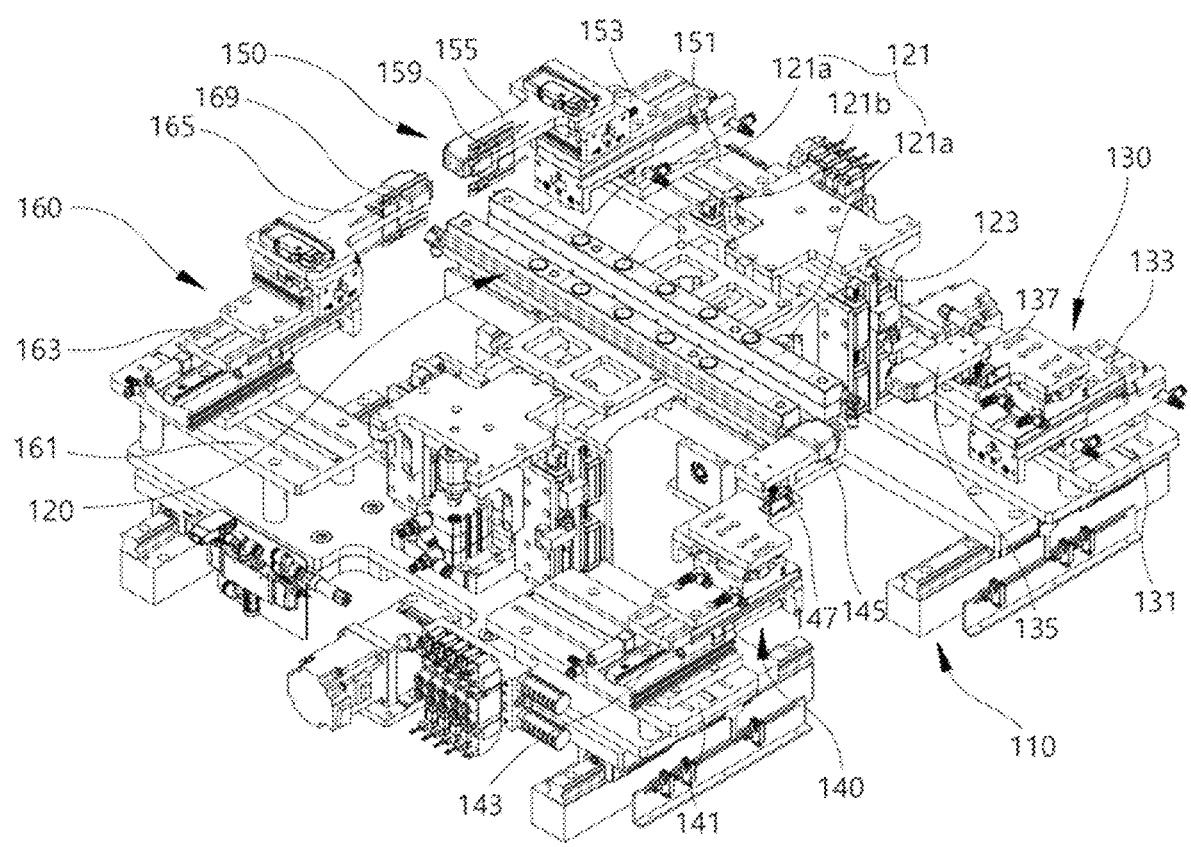
FIG. 1 is a view illustrating a battery cell terrace alignment device according to an embodiment of the present disclosure.
Figure 2:
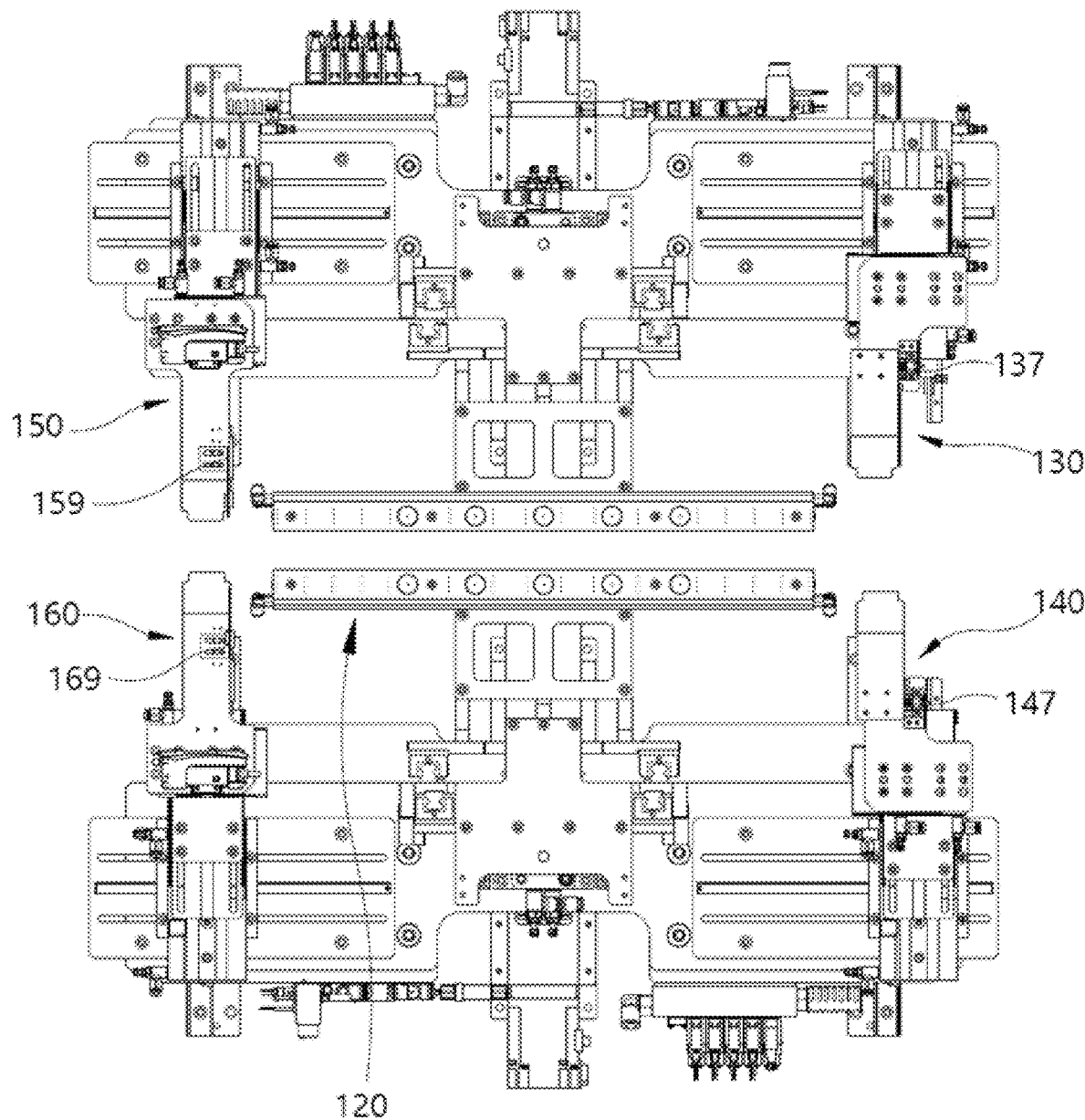
FIGS. 2, 3, 4 and 5 are views for explaining the battery cell terrace alignment device according to the embodiment of the present disclosure.
Figure 3:
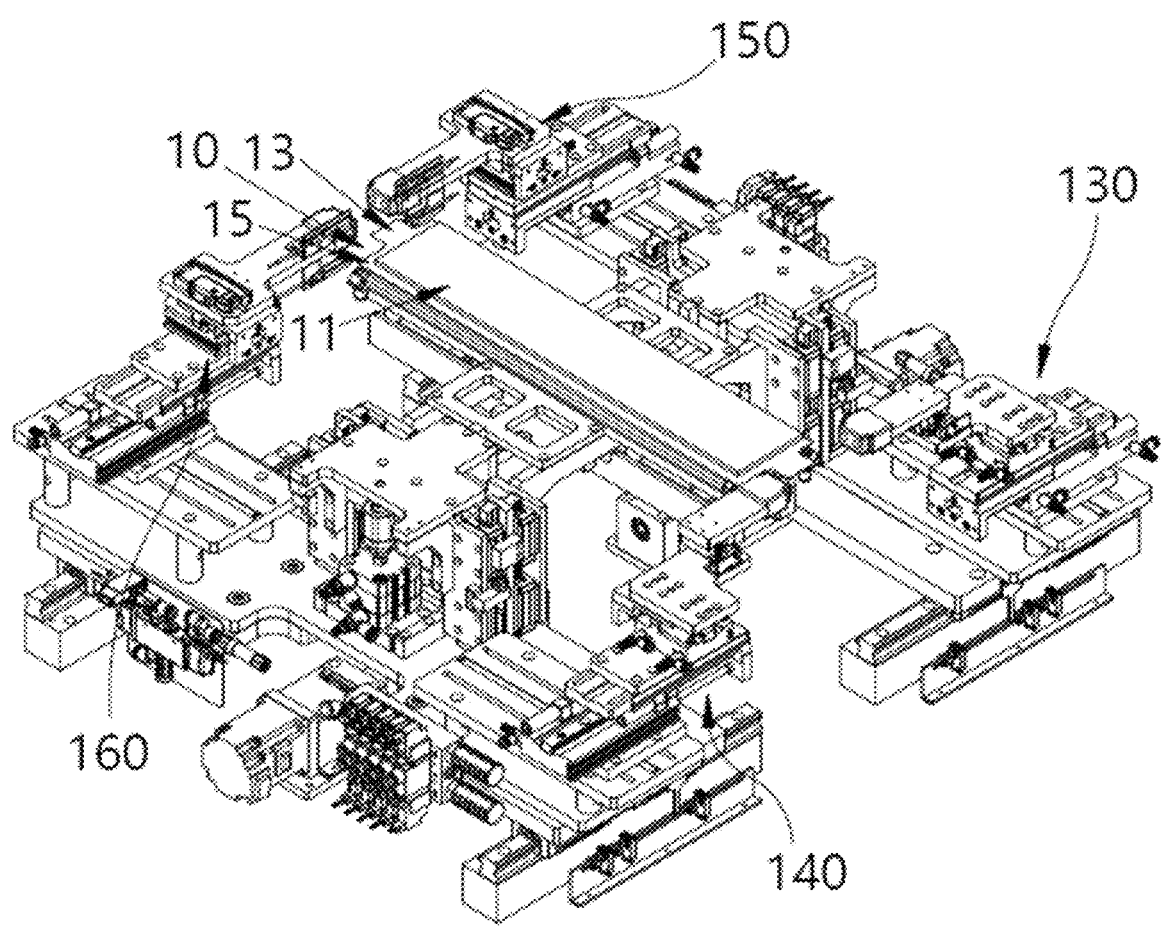
Figure 4:
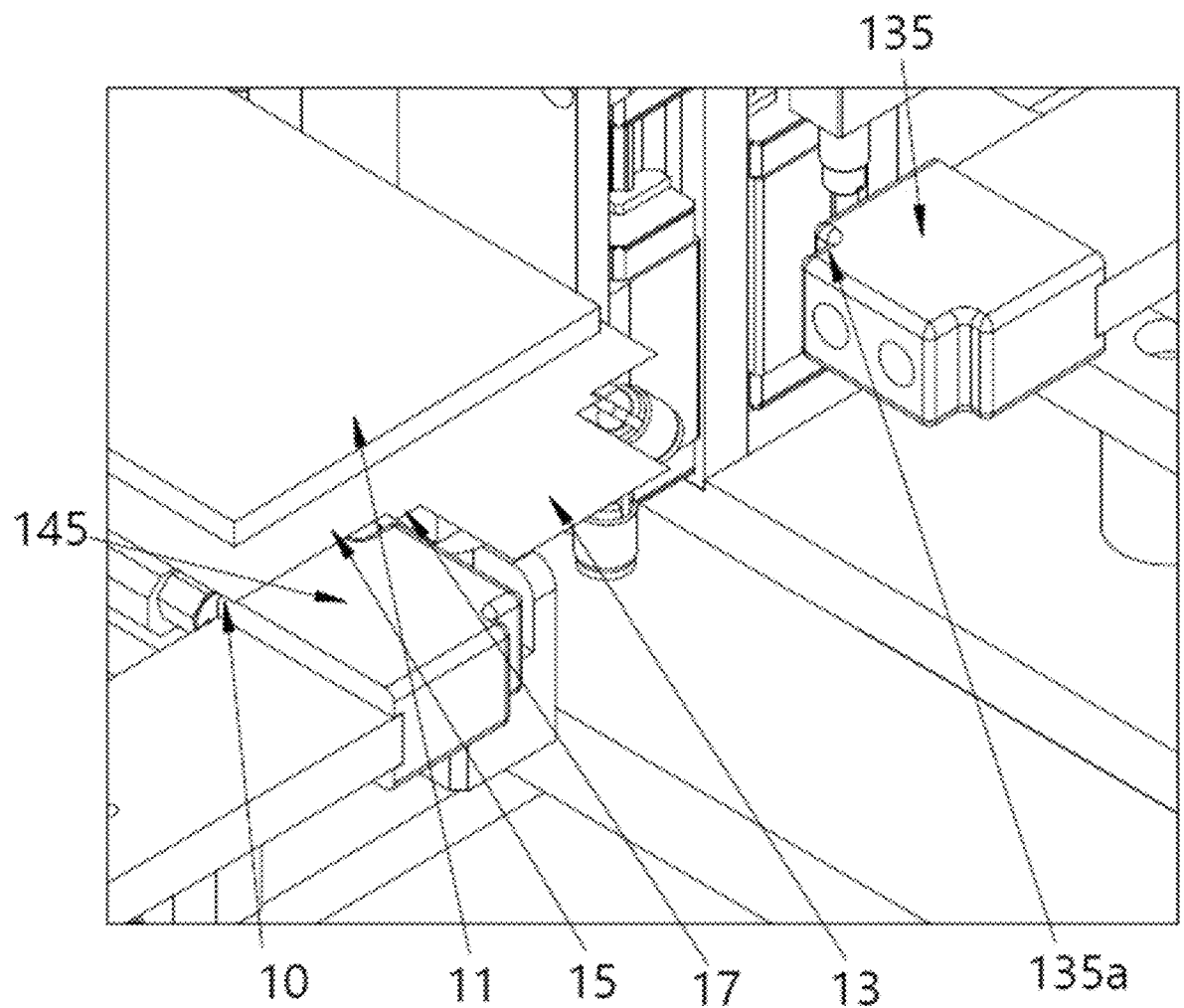

FIG. 1 is a view illustrating a battery cell terrace alignment device according to an embodiment of the present disclosure, and FIGS. 2 to 5 are views for explaining the battery cell terrace alignment device according to the embodiment of the present disclosure.

Referring to FIGS. 1 to 4, a battery cell terrace alignment device according to an embodiment of the present disclosure may include a base part 110, a table 120, a first front end support part 130, a second front end support part 140, a first rear end support part 150, and a second rear end support part 160.

The base part 110 may serve to support respective components to align a battery cell 10 and stably support the respective components by using a structure including a support frame, a support plate, and the like. The base part 110 may have various shapes made by combining a plurality of support frames, a plurality of support plates, and the like.

The table 120 may be provided above the base part 110 and serve to hold and support the battery cell 10 by a vacuum from below the battery cell 10. The table 120 may be provided in the form of a straight bar parallel to a process direction. The tables 120 may be provided in parallel two rows to support two opposite sides of a lower surface of the battery cell 10 in the process direction. The table 120 may have a plurality of vacuum pads 121 that holds the battery cell 10 by a vacuum by using a vacuum holding force that is selectively applied.

Figure 5:
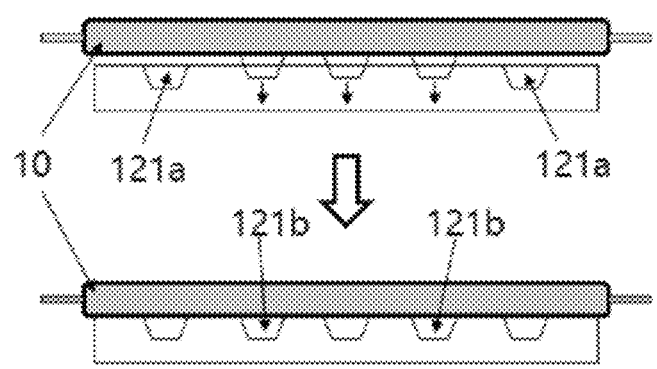

In this case, as illustrated in FIG. 5, among the plurality of vacuum pads 121, the vacuum pads 121b at a middle portion relatively further protrude than the vacuum pads 121a at two opposite ends, and elastic bodies may be provided on the vacuum pads at the middle portion, such that the vacuum pads at the middle portion are movable upward or downward. At the time of seating the battery cell 10 on an upper portion of the table, the vacuum pads 121b at the middle portion come into contact with the battery cell 10 first, and the vacuum pads 121b at the middle portion are moved downward by a weight of the battery cell 10. When the battery cell 10 being moved downward comes into contact with the vacuum pads 121a at the two opposite ends, the battery cell 10 may be held by a vacuum by a vacuum holding force.

Meanwhile, the table 120 may have a plurality of lifting holes 123 provided between the plurality of vacuum pads 121 and configured to provide a lifting force to the battery cell 10. During a process of aligning the battery cell 10 by using the first front end support part 130, the second front end support part 140, the first rear end support part 150, and the second rear end support part 160, air is discharged to the contact surface of the battery cell 10 through the plurality of lifting holes 123, and the battery cell 10 may be easily pushed and moved upward, such that mobility of the battery cell 10 is improved, which makes it possible to easily align the battery cell 10.

In this case, the supply of the vacuum holding force to the plurality of vacuum pads 121 may cut off or the amount of vacuum holding force may be decreased, such that the movement of the battery cell 10 may be easily adjusted by the air discharged through the plurality of lifting holes 123.

The first front end support part 130 may be disposed above the base part 110 and provided at one side of the table 120 at a front end based on the process direction so as to be movable along XY-axes to come into close contact with the battery cell 10. The first front end support part 130 may include a first X-axis guide 131, a first Y-axis guide 133, a first alignment block 135, and the like. In this case, the X-axis means a longitudinal direction of the table 120, and the Y-axis means a direction perpendicular to the longitudinal direction of the table 120.

The first X-axis guide 131 moves the first alignment block 135 in the direction parallel to the longitudinal direction of the table 120, and the first Y-axis guide 133 moves the first alignment block 135 in the direction perpendicular to the first X-axis guide 131. The first alignment block 135 may come into contact with the battery cell 10 by being moved by the first X-axis guide 131 and the first Y-axis guide 133.

For example, the first alignment block 135 may be moved by the first X-axis guide 131 to a position at which the first alignment block 135 comes into contact with a front end tip of the terrace 15, and then the battery cell 10 may be moved to an X-axis position at which the terrace cutting is performed. The first alignment block 135 may be moved by the first Y-axis guide 133 to a position at which the first alignment block 135 comes into contact with a lateral tip of the electrode 13, and then the battery cell 10 may be moved to a Y-axis position at which the terrace cutting is performed.

In addition, the first alignment block 135 may be moved by the first Y-axis guide 133 to a position at which the first alignment block 135 comes into contact with a lateral surface of the electrode 13, and then the battery cell 10 may be moved to the Y-axis position at which the terrace cutting is performed. The first alignment block 135 may be moved by the first X-axis guide 131 to the position at which the first alignment block 135 comes into contact with the front end tip of the terrace 15, and then the battery cell 10 may be moved to the X-axis position at which the terrace cutting is performed.

In this case, the first alignment block 135 may come into contact with the lateral surface of the battery cell 10 or come into contact with the electrode 13 and the terrace 15 of the battery cell 10. A contact end 135a may be formed on a portion that comes into contact with the electrode 13 and the terrace 15 of the battery cell 10, and the contact end 135a has a stepped portion corresponding in shape to an insulation film 17.

For example, the electrodes 13 of the battery cell 10 are provided at two opposite ends of a main chamber area 11 based on the longitudinal direction of the main chamber area 11, and the terrace 15 is provided along a peripheral portion of the main chamber area 11. Because the terrace 15 is formed in a state in which the electrode 13 is insulated by the insulation film 17, a bent portion of the electrode 13 and a bent portion of the terrace 15 each have a stepped portion because of the insulation film 17. Therefore, the contact end 135a is formed in a shape corresponding the stepped portion defined by the electrode 13, the terrace 15, and the insulation film 17 and disposed at each of the two opposite sides of the end of the first alignment block 135, such that the first alignment block 135 may come into close contact with the electrode 13, the terrace 15, and the insulation film 17 of the battery cell 10 while corresponding in shape to the electrode 13, the terrace 15, and the insulation film 17 of the battery cell 10.

The second front end support part 140 may be disposed above the base part 110 and provided at the other side of the table 120 at the front end based on the process direction so as to be movable along the XY-axes to come into close contact with the battery cell 10. The second front end support part 140 may include a second X-axis guide 141, a second Y-axis guide 143, a second alignment block 145, and the like. Because the second X-axis guide 141, the second Y-axis guide 143, and the second alignment block 145 are similar to the first X-axis guide 131, the first Y-axis guide 133, and the first alignment block 135, a specific description thereof will be omitted.

The first rear end support part 150 may be disposed above the base part 110 and provided at one side of the table 120 at a rear end based on the process direction so as to be movable in the XY-axes to come into close contact with the battery cell 10. The first rear end support part 150 may include a third X-axis guide 151, a third Y-axis guide 153, a third alignment block 155, and the like. Because the third X-axis guide 151, the third Y-axis guide 153, and the third alignment block 155 are similar to the first X-axis guide 131, the first Y-axis guide 133, and the first alignment block 135, a specific description thereof will be omitted.

The second rear end support part 160 may be disposed above the base part 110 and provided at the other side of the table 120 at the rear end based on the process direction so as to be movable along the XY-axes to come into close contact with the battery cell 10. The second rear end support part 160 may include a fourth X-axis guide 161, a fourth Y-axis guide 163, a fourth alignment block 165, and the like. Because the fourth X-axis guide 161, the fourth Y-axis guide 163, and the fourth alignment block 165 are similar to the first X-axis guide 131, the first Y-axis guide 133, and the first alignment block 135, a specific description thereof will be omitted.

An operation of aligning the battery cell 10 by using the first front end support part 130, the second front end support part 140, the first rear end support part 150, and the second rear end support part 160 may be performed in a predetermined manner in accordance with the size of the main chamber area 11 of the battery cell 10. The front end of the battery cell 10 may be aligned by using the first front end support part 130 and the second front end support part 140 so that the rear end of the battery cell 10 is moved to the terrace cutting position in order to cut the edge portion of the rear end of the terrace 15 of the battery cell 10 along an oblique line.

In this case, to align the battery cell 10 by using the first front end support part 130 and the second front end support part 140, the first alignment block 135 and the second alignment block 145 may respectively have a first close-contact member 137 and a second close-contact member 147 that provide an elastic force in the X-axis direction to allow the first alignment block 135 and the second alignment block 145 to come into close contact with the front end of the battery cell 10 in the rear end direction.

When the first alignment block 135 and the second alignment block 145 are moved to the X-axis position, at which the terrace cutting is performed on the rear end of the battery cell 10, after the first alignment block 135 and the second alignment block 145 are moved from the front end position of the battery cell 10 in the rear end direction by the first X-axis guide 131 and the second X-axis guide 141 to the positions at which the first alignment block 135 and the second alignment block 145 come into contact with the terrace 15, the first and second close-contact members 137 and 147 each including an elastic spring or the like respectively may provide the elastic force in the rear end direction to the first and second alignment blocks 135 and 145, thereby preventing in advance the movement of the battery cell 10.

Meanwhile, to align the battery cell 10 by using the first alignment block 135 and the second alignment block 145, a third main chamber guide member 159 and a fourth main chamber guide member 169 may be respectively provided on the third alignment block 155 of the first rear end support part 150 and the fourth alignment block 165 of the second rear end support part 160 and disposed opposite ends of the first close-contact member 137 and the second close-contact member 147. The third main chamber guide member 159 and the fourth main chamber guide member 169 may guide the main chamber area 11 of the battery cell 10 to the inner side at which the battery cell 10 is positioned.

For example, the third and fourth alignment blocks 155 and 165 may respectively have main chamber guide plates and main chamber guide pins provided to be movable inward or outward along the main chamber guide plates. Therefore, the main chamber area 11 may be aligned to the terrace cutting position while being guided by the third and fourth main chamber guide members 155c and 165c at the rear end of the battery cell 10, which is the opposite end, while the front end of the battery cell 10 is aligned by the first alignment block 135 and the second alignment block 145.

Figure 6:
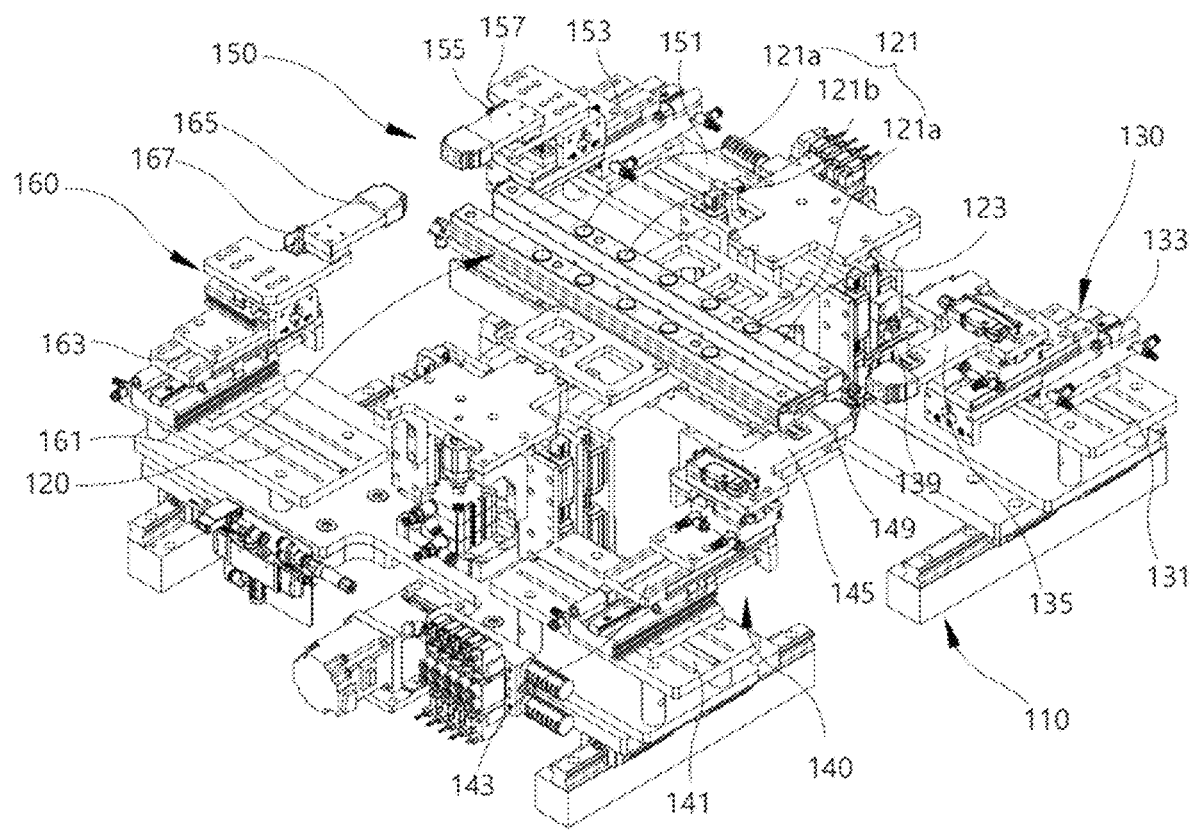
FIGS. 6 and 7 are views for explaining a battery cell terrace alignment device according to another embodiment of the present disclosure.
Figure 7:
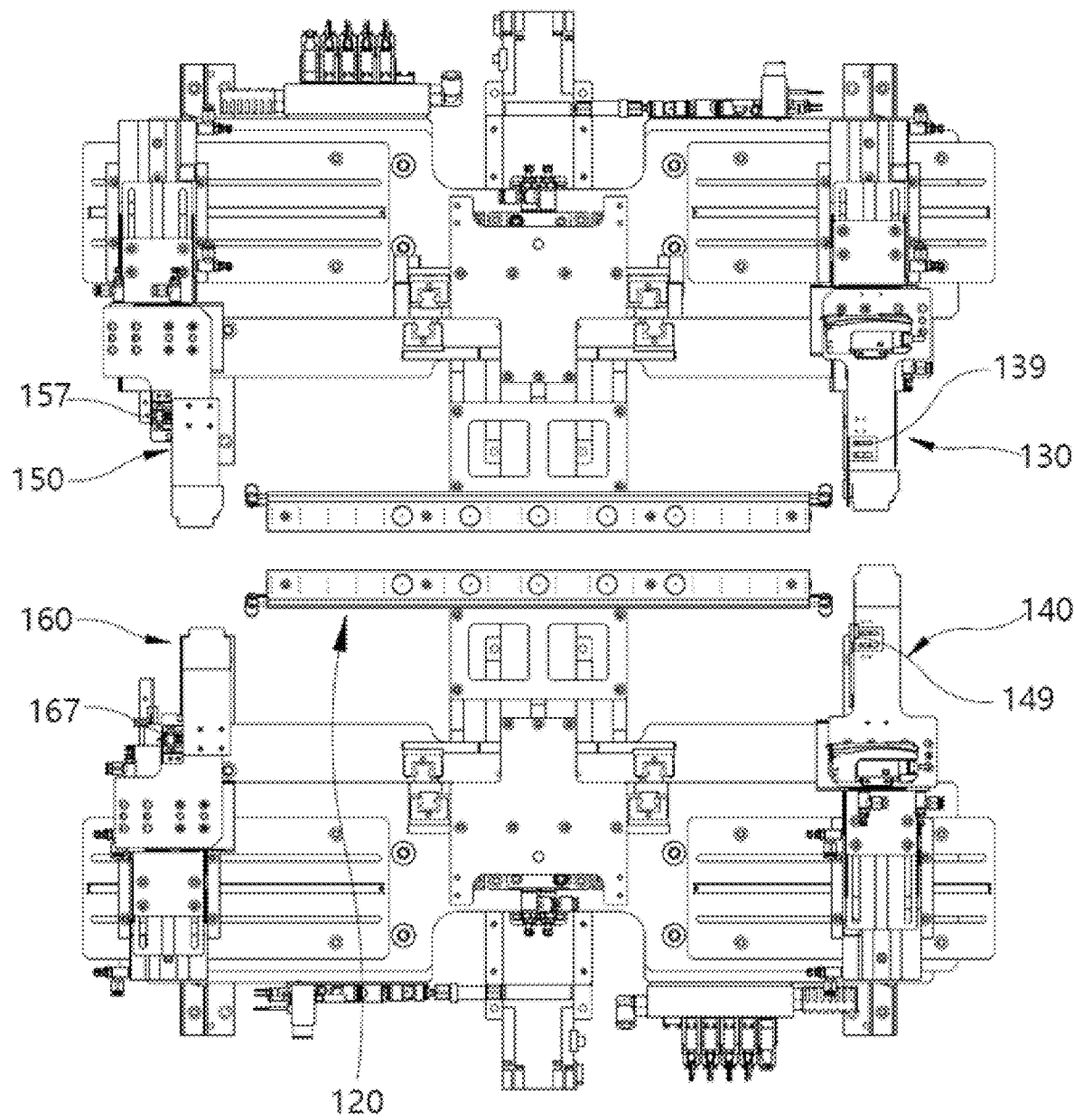

Meanwhile, FIGS. 6 to 7 are views for explaining the battery cell terrace alignment device according to the embodiment of the present disclosure.

Referring to FIGS. 6 and 7, a battery cell terrace alignment device according to another embodiment of the present disclosure may include a base part 110, a table 120, a first front end support part 130, a second front end support part 140, a first rear end support part 150, a second rear end support part 160, and the like. Because these components are similar to those according to the above-mentioned embodiment, only the differences will be described below.

An operation of aligning the battery cell 10 by using the first front end support part 130, the second front end support part 140, the first rear end support part 150, and the second rear end support part 160 may be performed in a predetermined manner in accordance with the size of the main chamber area 11 of the battery cell 10. The rear end of the battery cell 10 may be aligned by using the first rear end support part 150 and the second rear end support part 160 so that the front end of the battery cell 10 is moved to the terrace cutting position in order to cut the edge portion of the front end of the terrace 15 of the battery cell 10 along an oblique line.

In this case, to align the battery cell 10 by using the first rear end support part 150 and the second rear end support part 160, the third alignment block 155 and the fourth alignment block 165 may respectively have a third close-contact member 157 and a fourth close-contact member 167 that provide an elastic force in the X-axis direction to allow the third alignment block 155 and the fourth alignment block 165 to come into close contact with the rear end of the battery cell 10 in the front end direction.

When the third alignment block 155 and the fourth alignment block 165 are moved to the X-axis position, at which the terrace cutting is performed on the front end of the battery cell 10, after the third alignment block 155 and the fourth alignment block 165 are moved from the rear end position of the battery cell 10 in the front end direction by the third X-axis guide 151 and the fourth X-axis guide 161 to the positions at which the third alignment block 155 and the fourth alignment block 165 come into contact with the terrace 15, the third and fourth close-contact members 157 and 167 each including an elastic spring or the like may provide the elastic force in the front end direction to the third and fourth alignment blocks 155 and 165, thereby preventing in advance the movement of the battery cell 10.

Meanwhile, to align the battery cell 10 by using the third alignment block 155 and the fourth alignment block 165, a first main chamber guide member 139 and a second main chamber guide member 149 may be respectively provided on the first alignment block 135 of the first front end support part 130 and the second alignment block 145 of the second front end support part 140 and disposed opposite ends of the third close-contact member 157 and the fourth close-contact member 167. The first main chamber guide member 139 and the second main chamber guide member 149 may guide the main chamber area 11 of the battery cell 10 to the inner side at which the battery cell 10 is positioned.

For example, the first and second alignment blocks 135 and 145 may respectively have main chamber guide plates and main chamber guide pins provided to be movable inward or outward along the main chamber guide plates. Therefore, the main chamber area 11 may be aligned to the terrace cutting position while being guided by the first and second main chamber guide members 139 and 149 at the front end of the battery cell 10, which is the opposite end, while the rear end of the battery cell 10 is aligned by the third alignment block 155 and the fourth alignment block 165.

Therefore, according to the present disclosure, it is possible to precisely align the battery cell for cutting the edge of the terrace of the battery cell by simultaneously bringing the plurality of alignment blocks into contact with the electrode and the terrace, and the plurality of alignment blocks may correspond in shape to the electrode and the terrace of the battery cell.

Further, according to the present disclosure, it is possible to prevent the upward and downward movements of the battery cell for cutting the terrace of the battery cell by stably supporting and fixing the battery cell by using the plurality of vacuum pads provided on the table on which the battery cell to be aligned is seated.

In addition, according to the present disclosure, the plurality of lifting holes is provided in the table on which the battery cell to be aligned is seated, such that the battery cell may be lifted from the lower side to the upper side, and the plurality of alignment blocks may easily push and move the battery cell, thereby precisely aligning the battery cell to a desired position.

In the embodiment of the present disclosure described above, the configuration has been described in which the edge of the rear end of the terrace 15 of the battery cell 10 is cut while the battery cell 10 is aligned by the first front end support part 130 and the second front end support part 140 or the edge of the front end of the terrace 15 of the battery cell 10 is cut while the battery cell 10 is aligned by the first rear end support part 150 and the second rear end support part 160. However, the battery cell 10 may be aligned by the first front end support part 130 and the first rear end support part 140 or the battery cell 10 may be aligned by the second front end support part 140 and the second rear end support part 160. Even in this case, the edge of the front end of the terrace 15 of the battery cell 10 or the edge of the rear end of the terrace 15 of the battery cell 10 may be selectively cut.

What is claimed is:

1. A battery cell terrace alignment device comprising:
    a base part configured to support respective components to align a battery cell placed on an XY-plane;
    a table provided straight (in an X-axis direction) in parallel with a process direction and configured to support a lower surface of the battery cell in the process direction;
    a first front end support part provided on the base part and configured to be movable along XY-axes so as to come into close contact with one side of a front end of the battery cell;
    a second front end support part provided on the base part and configured to be movable along the XY-axes so as to come into close contact with the other side of the front end of the battery cell;
    a first rear end support part provided on the base part and configured to be movable along the XY-axes so as to come into close contact with one side of a rear end of the battery cell;
    a second rear end support part provided on the base part and configured to be movable along the XY-axes so as to come into close contact with the other side of the rear end of the battery cell;
    alignment blocks respectively provided in the first front end support part, the second front end support part, the first rear end support part, and the second rear end support part and configured to come into contact with the battery cell;
    a close-contact member provided in any one of the first front end support part and the second front end support part or any one of the first rear end support part and the second rear end support part and configured to provide an elastic force in an X-axis direction to allow the alignment block to come into close contact with the battery cell in a rear end direction or a front end direction; and
    a main chamber guide member provided in the other of the first front end support part and the second front end support part or the other of the first rear end support part and the second rear end support part, where the close-contact member is not provided, the main chamber guide member being configured to guide a main chamber area of the battery cell.

2. The battery cell terrace alignment device of claim 1, wherein the first front end support part, the second front end support part, the first rear end support part, and the second rear end support part each comprise:
    an X-axis guide configured to move the alignment block in a direction parallel to a longitudinal direction of the table; and
    a Y-axis guide configured to move the alignment block in a direction perpendicular to the X-axis guide, and
    wherein the alignment block comes into contact with the battery cell by being moved by the X-axis guide and the Y-axis guide.

3. The battery cell terrace alignment device of claim 2, wherein the alignment block comes into contact with a lateral surface of the battery cell or comes into contact with an electrode and a terrace of the battery cell.

4. The battery cell terrace alignment device of claim 3, wherein the alignment block has a contact end formed at a portion of the alignment block that comes into contact with the electrode and the terrace of the battery cell, and the contact end has a stepped portion corresponding in shape to an insulation film.

5. The battery cell terrace alignment device of claim 1, wherein the table is provided in the form of a straight bar parallel to the process direction,
    wherein the tables are provided in two parallel rows to support two opposite sides of the lower surface of the battery cell in the process direction, and
    wherein the table has a plurality of vacuum pads configured to hold the battery cell by a vacuum by a vacuum holding force that is selectively applied.

6. The battery cell terrace alignment device of claim 5, wherein among the plurality of vacuum pads, the vacuum pad at a middle portion relatively further protrudes than the vacuum pads at two opposite ends, and the vacuum pad at the middle portion has an elastic body, such that the vacuum pad is movable upward or downward.

7. The battery cell terrace alignment device of claim 5, wherein the table has a plurality of lifting holes disposed between the plurality of vacuum pads and configured to provide a lifting force to the battery cell.

* * * * *